United States Patent
Kim

(10) Patent No.: US 9,479,702 B2
(45) Date of Patent: Oct. 25, 2016

(54) PHOTOGRAPHING APPARATUS AND METHOD OF CONTROLLING THE SAME

(71) Applicant: SAMSUNG ELECTRONICS CO., LTD., Suwon-si, Gyeonggi-do (KR)

(72) Inventor: Dong-su Kim, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 14/183,802

(22) Filed: Feb. 19, 2014

(65) Prior Publication Data

US 2015/0055006 A1  Feb. 26, 2015

(30) Foreign Application Priority Data

Aug. 23, 2013 (KR) .................. 10-2013-0100574

(51) Int. Cl.
*H04N 5/232* (2006.01)

(52) U.S. Cl.
CPC ...... *H04N 5/23293* (2013.01); *H04N 5/23212* (2013.01)

(58) Field of Classification Search
CPC .................. H04N 5/23293; H04N 5/23212; G06T 7/004–7/0048
USPC ................................ 348/333.01–333.12, 345
See application file for complete search history.

(56) References Cited

U.S. PATENT DOCUMENTS

| | | | |
|---|---|---|---|
| 8,233,789 B2* | 7/2012 | Brunner | 396/213 |
| 2006/0109371 A1 | 5/2006 | Sasaki et al. | |
| 2007/0018069 A1* | 1/2007 | Higashino | 250/200 |
| 2009/0195689 A1* | 8/2009 | Hwang | G03B 13/36 348/349 |
| 2010/0062803 A1* | 3/2010 | Yun | H04N 5/23216 455/556.1 |
| 2010/0146459 A1* | 6/2010 | Repka | G06F 3/0488 715/863 |
| 2013/0249809 A1* | 9/2013 | Kawalkar | G06F 3/016 345/173 |
| 2014/0025857 A1* | 1/2014 | Lippett | G06F 9/4812 710/267 |

* cited by examiner

*Primary Examiner* — Aung S Moe
*Assistant Examiner* — Chriss Yoder, III
(74) *Attorney, Agent, or Firm* — Drinker Biddle & Reath LLP

(57) ABSTRACT

Provided are photographing apparatuses and methods of controlling the same. The photographing apparatuses may set an auto-focusing (AF) region according to a touch, a drag, and a touch release on a touchscreen, thereby making it possible to prevent the AF region from being easily shifted by an unintended touch of a user.

17 Claims, 8 Drawing Sheets

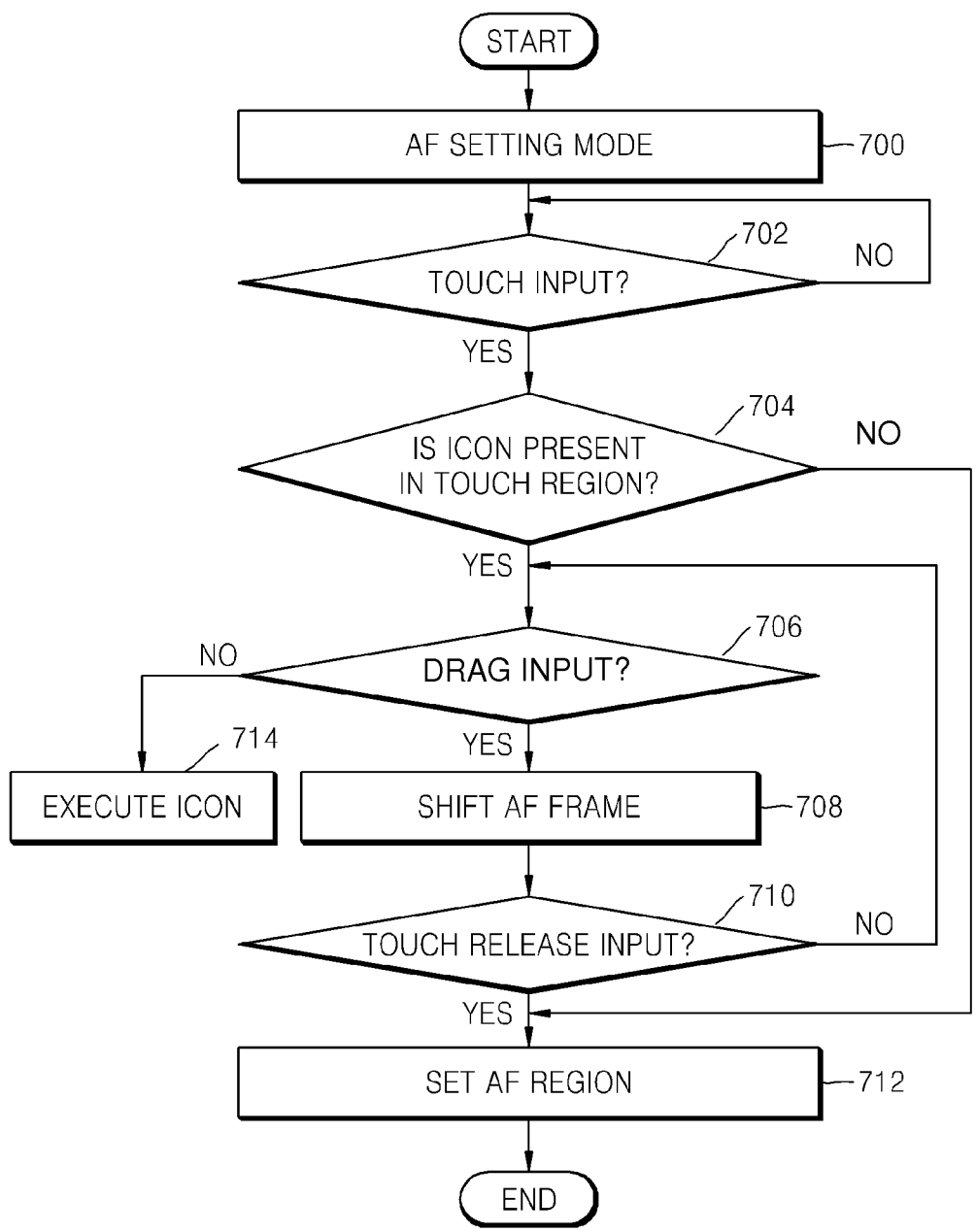

PHOTOGRAPHING APPARATUS AND METHOD OF CONTROLLING THE SAME

RELATED APPLICATIONS

This application claims the priority benefit of Korean Patent Application No. 10-2013-0100574, filed on Aug. 23, 2013, in the Korean Intellectual Property Office, the disclosure of which is incorporated herein in its entirety by reference.

BACKGROUND

1. Field

One or more embodiments relate to photographing apparatuses and methods of controlling the same.

2. Description of the Related Art

Newer cameras equipped with touchscreens allow a user to select, by touch, a region of a live image or a preview image on which to carry out auto-focusing (AF). This is very convenient for the user. Using the touchscreen, the user is also able to change the AF region very quickly and conveniently. As touchscreens have increased in size, however, it has become easier for users to accidentally make contact with the touchscreen. When this happens, the AF may be unintentionally shifted, and the user is inconvenienced by having to set the AF region again.

SUMMARY

One or more embodiments include photographing apparatuses and methods of controlling the same, which may set an auto-focusing (AF) region according to a touch, a drag, and a touch release on a touchscreen, thereby making it possible to prevent the AF region from being easily shifted by an unintended touch of a user.

Additional aspects will be set forth in part in the description which follows and, in part, will be apparent from the description, or may be learned by practice of the disclosed embodiments.

According to one or more embodiments, a method of controlling a photographing apparatus includes: displaying an auto-focusing (AF) frame for AF region setting on a display screen according to a touch input; shifting the AF frame according to a drag input to the AF frame; and setting the AF frame as an AF region when a touch release input is received.

The AF frame may be shifted according to a drag direction when the drag input is received.

The method may further include: displaying an initial AF frame on the display screen; and displaying the AF frame having a different color from a color of the initial AF frame when the touch input is received.

The color of the AF frame may be changed into the color of the initial AF frame when the touch release input is received.

When an execution icon is present in a region of the display screen corresponding to the touch input, whether to execute the execution icon may be determined according to the drag input.

The execution icon may not be executed when the drag input is received.

When a subject is moving, the subject may be tracked according to the drag input.

A region including the subject may be set as the AF region according to a result of the tracking.

The AF region may be corrected according to the result of the tracking.

The AF frame may be fixed when another touch input is received on the display screen after the AF region is set.

The method may further include displaying a graphical user interface (GUI) indicating the setting of the AF region when the touch input is received.

According to one or more embodiments, a photographing apparatus includes: a user input recognizing unit configured to recognize at least one of a touch input, a drag input, and a touch release input on a display screen; and an auto-focusing (AF) region setting unit configured to display an AF frame for AF region setting on the display screen according to the touch input, shift the AF frame according to the drag input to the AF frame, and set the AF frame as an AF region when the touch release input is received.

The AF region setting unit may shift the AF frame according to a drag direction when the drag input is received.

An initial AF frame may be displayed on the display screen, and the AF frame having a different color from a color of the initial AF frame may be displayed when the touch input is received.

The photographing apparatus may further include an AF target checking unit configured to determine, when an execution icon is present in a region of the display screen corresponding to the touch input, whether to execute the execution icon according to the drag input, and not to execute the execution icon when the drag input is received.

The photographing apparatus may further include an AF target checking unit configured to track, when a subject is moving, the subject according to the drag input to check an AF target.

The AF region setting unit may set a region, including the subject, as the AF region according to a result of the tracking by the AF target checking unit.

The AF region may be corrected according to the result of the tracking.

A graphical user interface (GUI) indicating the setting of the AF region may be displayed when the touch input is received.

According to one or more embodiments, a recording medium stores a program which, when executed by a computer, performs the above method.

BRIEF DESCRIPTION OF THE DRAWINGS

These and/or other aspects will become apparent and more readily appreciated from the following description of the embodiments, taken in conjunction with the accompanying drawings in which:

FIG. 7 is a flowchart illustrating a method of controlling the photographing apparatus, according to another embodiment.

DETAILED DESCRIPTION

Figure 1:
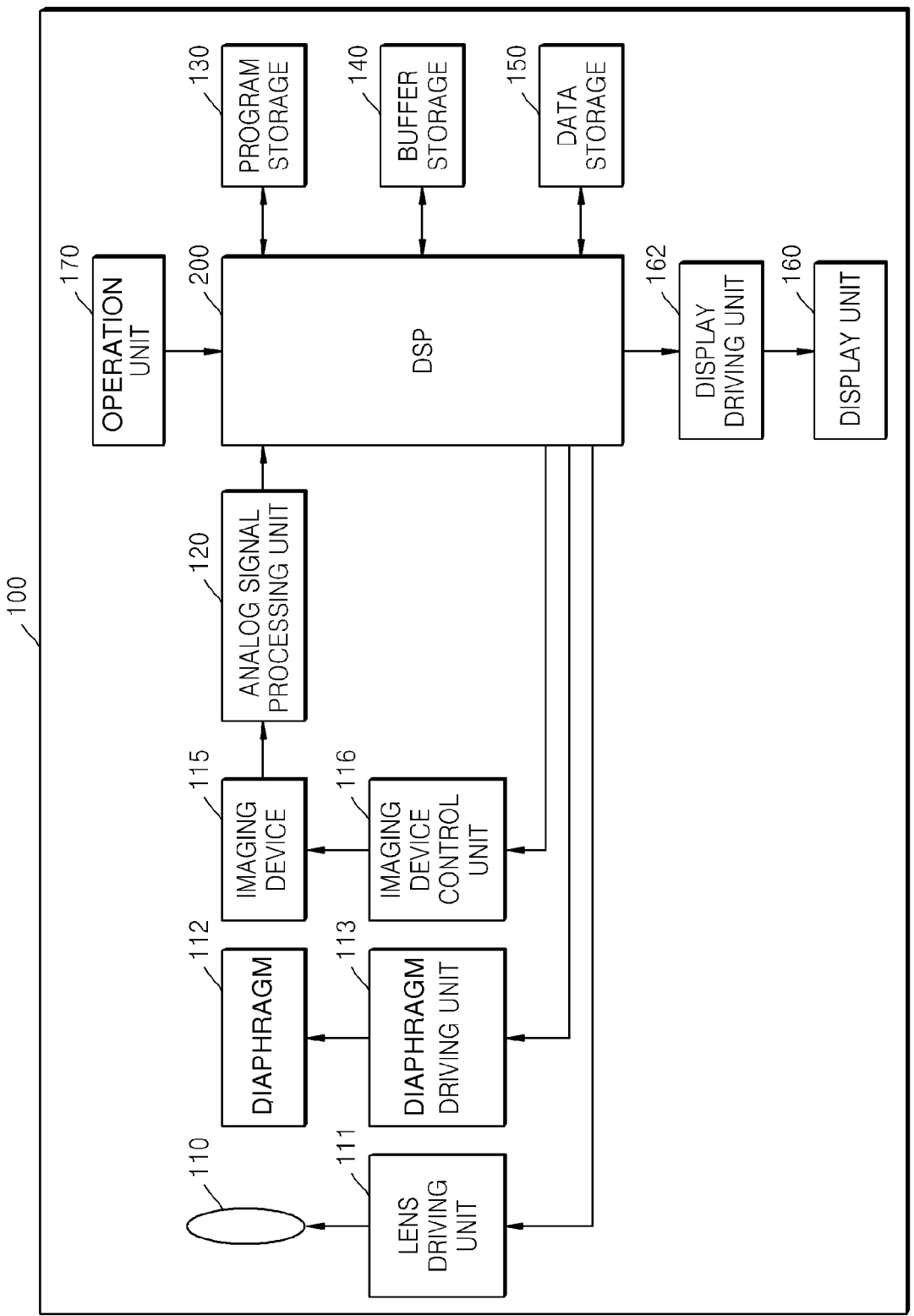
FIG. 1 is a diagram illustrating a schematic configuration of a digital camera as an example of a photographing apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are described below by referring to the figures. Expressions such as "at least one of," when preceding a list of elements, modify the entire list of elements.

It will be understood that, although the terms, 'first', 'second', etc. may be used herein to describe various elements, these elements should not be limited by these terms. These terms are only used to distinguish one element from another.

Hereinafter, embodiments will be described in detail with reference to the accompanying drawings. In the following description, like reference numerals denote like elements, and a redundant description thereof will be omitted.

FIG. 1 is a diagram illustrating a schematic configuration of a digital camera 100 as an example of a photographing apparatus according to an embodiment.

However, the embodiments described herein may be part of or be carried out on other types of photographing apparatuses, such as camera phones, personal digital assistants (PDAs), and portable multimedia players (PMPs).

The digital camera 100 may include a lens unit 110, a lens driving unit 111, a diaphragm 112, a diaphragm driving unit 113, an imaging device 115, an imaging device control unit 116, an analog signal processing unit 120, a program storage unit 130, a buffer storage unit 140, a data storage unit 150, a display unit 160, a display driving unit 162, a digital signal processing unit (DSP) 200, and an operation unit 170. Herein, the lens unit 110, the lens driving unit 111, the diaphragm 112, the diaphragm driving unit 113, the image device 115, the imaging device control unit 116, and the analog signal processing unit 120 may be collectively referred to as an imaging unit.

The lens unit 110 concentrates an optical signal. The lens unit 110 may include a zoom lens for increasing or decreasing a viewing angle according to a focal length, and a focus lens for focusing a subject. The zoom lens and the focus lens may each include one lens or a group of lenses. The diaphragm 112 controls the quantity of incident light is controlled by the opening and closing of the diaphragm.

The lens driving unit 111 drives the lens unit 110 according to a control signal from the DSP 200, and the diaphragm driving unit 113 drives the diaphragm 112 according to a control signal from the DSP 200. The lens driving unit 111 controls the position of one or more lenses of the lens unit 110 to control a focal length thereof, and may also perform an auto-focusing (AF) operation, a zoom change operation, and a focus change operation. The diaphragm driving unit 113 controls the degree of opening of the diaphragm 112. In particular, the diaphragm driving unit 113 controls an f-number or an iris value to perform an AF operation, an automatic exposure correction operation, a focus change operation, and a subject depth control operation.

An optical signal entering the lens unit 110 forms an image of the subject on a light-receiving surface of the imaging device 115. The imaging device 115 may include a charge-coupled device (CCD), a complementary metal-oxide-semiconductor image sensor (CIS), or a high-speed image sensor that converts the optical signal into an electrical signal. The sensitivity of the imaging device 115 may be controlled by the imaging device control unit 116. The imaging device control unit 116 may control the imaging device 115 according to a control signal that is automatically generated based on an image signal that is input in real time, or according to a control signal that is generated based on manual input by a user. The exposure time of the imaging device 115 is controlled by a shutter (not illustrated). Examples of types of shutters that may be used include a mechanical shutter that controls the incidence of light by shifting a shield, and an electronic shutter that controls exposure by supplying an electrical signal to the imaging device 115.

The analog signal processing unit 120 performs a noise reduction operation, a gain control operation, a waveform shaping operation, and an analog-to-digital conversion operation on an analog signal supplied by the imaging device 115.

The operation unit 170 may generate a control signal based on outside input, such as from a user. The operation unit 170 may include a shutter release button for providing a shutter release signal (i.e., to expose the imaging device 115 to light for a predetermined time), a video recording (REC) button for providing a video recording start signal and a video recording end signal, a power button for providing a control signal for controlling a power on/off, and a wide-angle zoom button and a telephoto zoom button for increasing or decreasing a viewing angle according to an input. The operation unit 170 may also include various function buttons, such as a mode selecting button for selecting a mode such as a character input mode, a photographing mode, or a display mode; a white balance setting button; and an exposure setting button. The operation unit 170 may have various buttons as described above, but is not limited thereto. The operation unit 170 may be implemented by any user input unit such as a keyboard, a touch pad, a touchscreen, or a remote controller.

According to an embodiment, the photographing apparatus includes a touchscreen and sets an AF region on the touchscreen according to a touch input, a drag input, and a touch release input. When the user touches the touchscreen while viewing a live view image or a preview image, drags a subject to be focused, shifts an AF frame, and then releases the touch, the photographing apparatus sets a region, including the subject, as an AF region. Once an AF region is set by a drag action, the AF region remains the same even when other regions are touched by mistake. To change the position of the AF region, the user touches the current AF region (e.g., touches an AF frame) and drags along the touchscreen (e.g., drags an AF frame) to a position where the user wishes the AF region to be. The new AF region is then set to this second position.

As touchscreens have become larger and bezel thickness has decreased, the likelihood of accidental touches by users has increased. Setting an AF region by a touch operation, a drag operation, and a touch release operation according to an embodiment may solve this problem. That is, the AF region remains the same even when the user touches the touchscreen after setting the AF region, thus making the photographing apparatus more convenient to use. A detailed configuration and operation according to an embodiment will be described later with reference to FIGS. 2 to 8.

Referring again to FIG. 1, the program storage unit 130 stores programs for an application system and an operating system, and the buffer storage unit 140 temporarily stores result data and data necessary for operation. The data storage unit 150 stores video files, image files (each of which includes an image signal), and various other information used by the programs.

The display unit 160 displays an operation state of the digital camera 100 and video data or image data captured by the digital camera 100. The display unit 160 may provide visual information and aural information to the user. In order to provide visual information, the display unit 160 may include, for example, a liquid crystal display (LCD) panel, or an organic light-emitting display (OLED) panel. The display driving unit 162 provides a driving signal to the display unit 160. In an embodiment, the display unit 160 may be provided at a rear surface of the digital camera 100, that is, a surface at which operation panels are located. Also, the display unit 160 may be disposed to face the subject or may be disposed at the rear surface in a basic state and flipped to face the subject. Also, the display unit 160 may be implemented by a dual LCD and provided at each of the rear surface and the front surface of the digital camera 100.

Referring still to FIG. 1, the DSP 200 processes input image signals and controls the respective component units according to external input signals. The DSP 200 may reduce noise in input image data and may perform image signal processing operations for image quality improvement, such as gamma correction, color filter array interpolation, color matrix, color correction, and color enhancement. Also, the DSP 200 may generate an image file by compressing the image data generated by the image signal processing operations for image quality improvement, or may restore the image data from the image file. An image compression format may be a reversible format or an irreversible format. The compressed data may be stored in the data storage unit 150. Also, the DSP 200 may perform functions such as coloring, blurring, edge emphasis, image interpretation, image recognition, and image effects. For image recognition, face recognition or scene recognition may be performed. For example, the DSP 200 may perform luminance level adjustment, color correction, contrast adjustment, outline emphasis adjustment, screen division, character image generation, and image synthesis.

Also, by executing a program stored in the program storage unit 130 or having a separate module, the DSP 200 may generate control signals for controlling auto focusing, zoom change, focus change, and automatic exposure correction. The DSP 200 may also provide the control signals to the lens driving unit 111, the diaphragm driving unit 113, and the imaging device control unit 116, and may control the overall operation of the components of the digital camera 100, such as a shutter and a flash unit.

Figure 2:
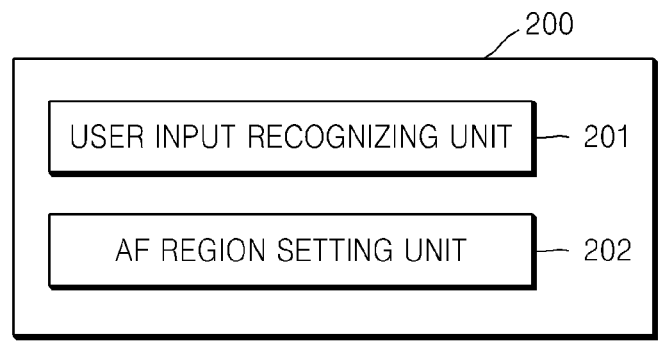
FIG. 2 is a schematic block diagram of an example of a digital signal processing unit (DSP) illustrated in FIG. 1.

FIG. 2 is a schematic block diagram of an example of the DSP 200 illustrated in FIG. 1.

Referring to FIG. 2, the DSP 200 includes a user input recognizing unit 201 and an AF region setting unit 202.

According to an embodiment, the DSP 200 sets an AF region on the touchscreen according to a touch input, a drag input, and a touch release input.

Figure 3:
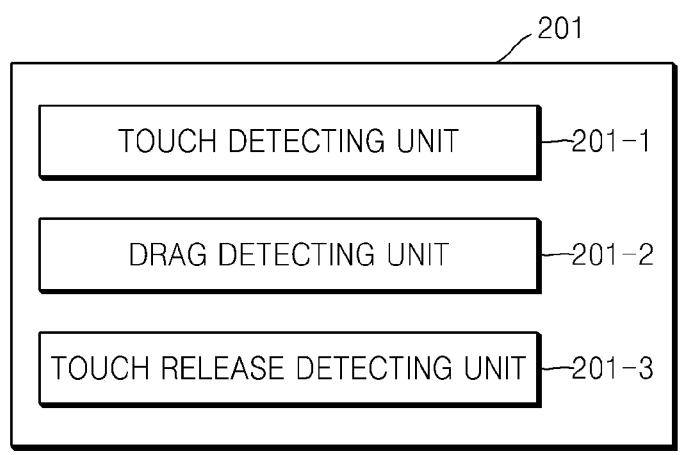
FIG. 3 is a schematic block diagram of a user input recognizing unit illustrated in FIG. 2.

The user input recognizing unit 201 recognizes a touch input, a drag input, and a touch release input on a display screen. Referring to FIG. 3, the user input recognizing unit 201 includes a touch detecting unit 201-1, a drag detecting unit 201-2, and a touch release detecting unit 201-3. The touch detecting unit 201-1 detects a user touch on a display screen (touchscreen) including a touch panel and a display panel. The drag detecting unit 201-2 detects a drag input to a touch region after the touch detecting unit 201-1 detects a touch input. The touch release detecting unit 201-3 detects whether the touch is released after the drag, after the drag detecting unit 201-2 detects the drag input. In an embodiment, the touch input, the drag input, and the touch release input are described as being detected by separate modules. However, embodiments are not limited thereto, and the touch input, the drag input, and the touch release input may be detected by one module.

The AF region setting unit 202 displays an AF frame for AF region setting according to the touch input received from the user input recognizing unit 201. Thereafter, the AF region setting unit 202 shifts the AF frame according to the drag input received from the user input recognizing unit 201. Thereafter, the AF region setting unit 202 sets the AF frame of the current position as an AF region according to the touch release input received from the user input recognizing unit 201.

The AF region setting unit 202 may display an initial AF frame on the display screen, and may shift, when a user touch is input, the initial AF frame to a position of the user touch input and display the AF frame. For example, a color of the initial AF frame may be white, and a color of the AF frame after the touch input may be green.

Figure 5A:
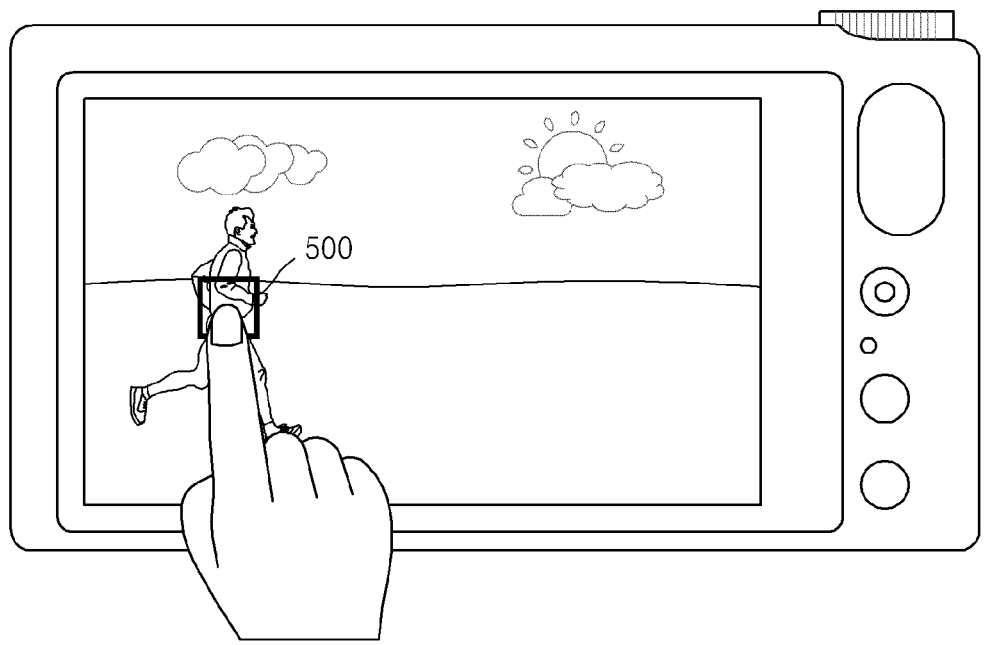
FIGS. 5A, 5B, and 5C are diagrams illustrating an example of setting an auto-focusing (AF) region according to an embodiment.

The AF region setting unit 202 may shift the AF frame in the direction it is being dragged (based on the drag input) after the color of the AF frame is changed according to the touch input, and may change the color to white—i.e., the color of the initial AF frame—when the touch is released. White and green are used as examples, but the disclosure is not limited thereto, and any suitable color may be used. Also, a graphical user interface (GUI) corresponding to the AF frame as configured by the touch, the drag, and the touch release may be displayed As illustrated in FIG. 5A, when the user touches a portion of the display screen in order to set an AF region in a live view image or a preview image, an AF frame 500 is displayed. An initial AF frame may be displayed at a center of the screen before the user touches the touchscreen, and the AF frame 500 may be shifted to a touch point by the user's touch. In this case, the color of the AF frame 500 may be changed by the user's touch.

Figure 5B:
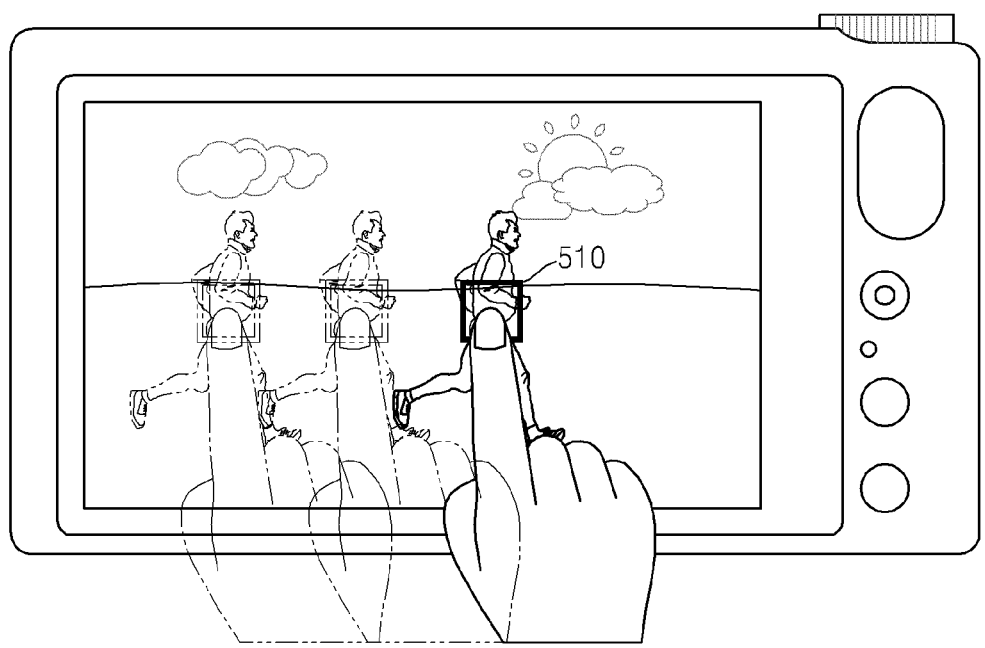

As illustrated in FIG. 5B, the user shifts an AF frame 510 by a drag at an initial touch point.

Figure 5C:
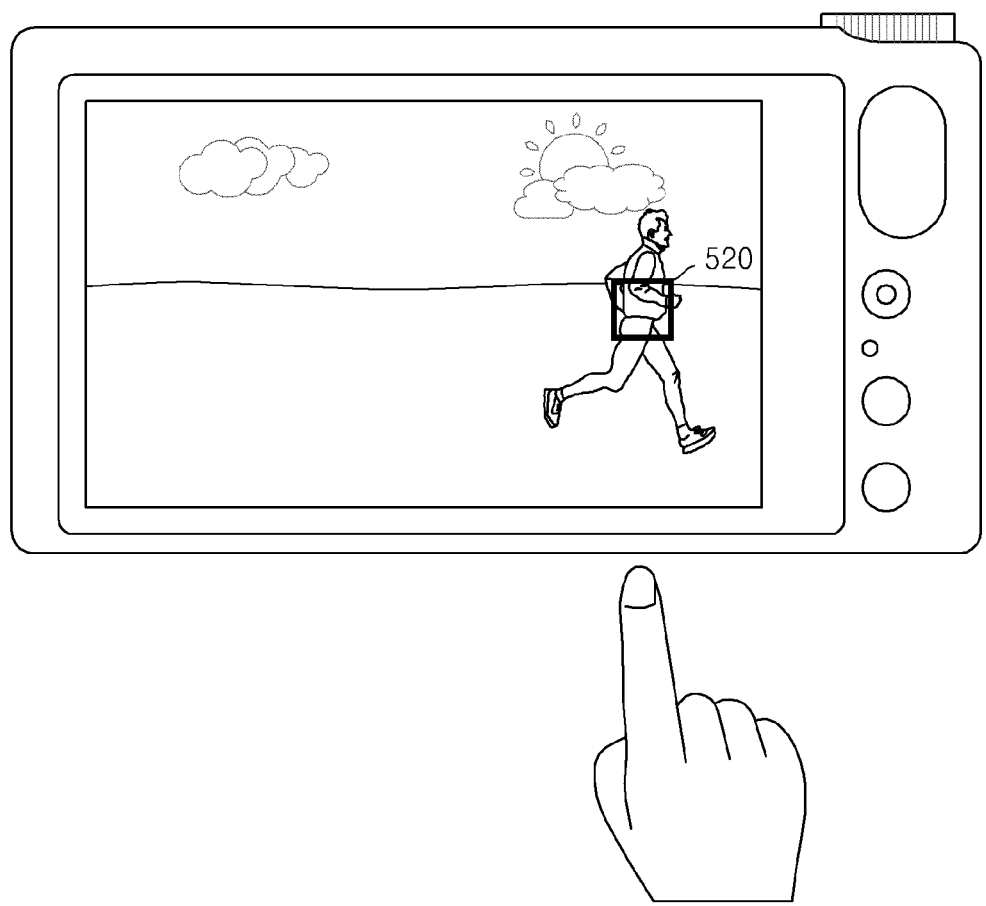

As illustrated in FIG. 5C, an AF frame 520 is set as an AF region at the point in time when the user releases the touch after a drag input. In this case, the AF frame 520 may change to the color of the initial AF frame before the AF setting is complete or after it is complete. After the AF region is set, the AF region becomes fixed in the sense that a touch input of the user or other touch input will not change it. The AF region does change when the user touches the display screen again and drags it to a desired region.

Figure 4:
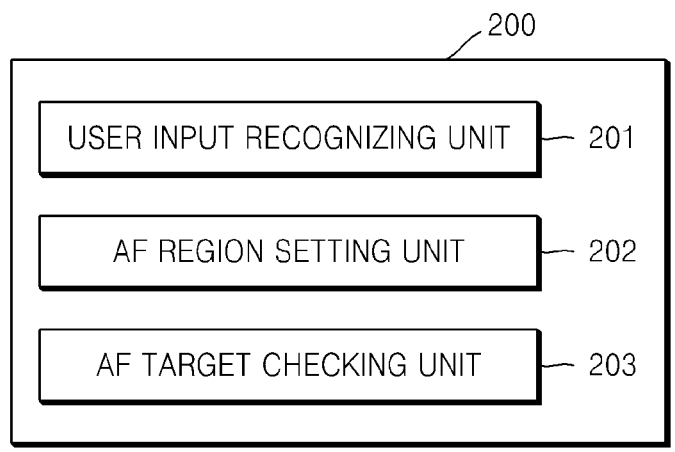
FIG. 4 is a schematic block diagram of another example of the DSP illustrated in FIG. 1.

FIG. 4 is a schematic block diagram of another example of the DSP 200 illustrated in FIG. 1.

Referring to FIG. 4, the DSP 200 includes a user input recognizing unit 201, an AF region setting unit 202, and an AF target checking unit 203. A description of those elements previously described in conjunction with FIG. 3 will be omitted.

The AF target checking unit 203 checks whether an execution icon is present in a region of a display screen that has received a touch input from the user (as indicated by the input recognizing unit 201), and determines whether to execute the execution icon according to whether a drag input is received after the touch input. When the drag input is received, the AF target checking unit 203 prevents the execution icon from being executed. To prevent the execution of the icon, the AF target checking unit 203 may transmit an execution icon disable signal to a control unit (not illustrated) that controls the execution of the execution icon. When the region receiving the touch input of the user and the execution icon on the display screen overlap each other, the AF target checking unit 203 determines whether to execute the execution icon or to perform AF region setting according to what is perceived to be the user's intention (e.g., the user's touch input).

Figure 8A:
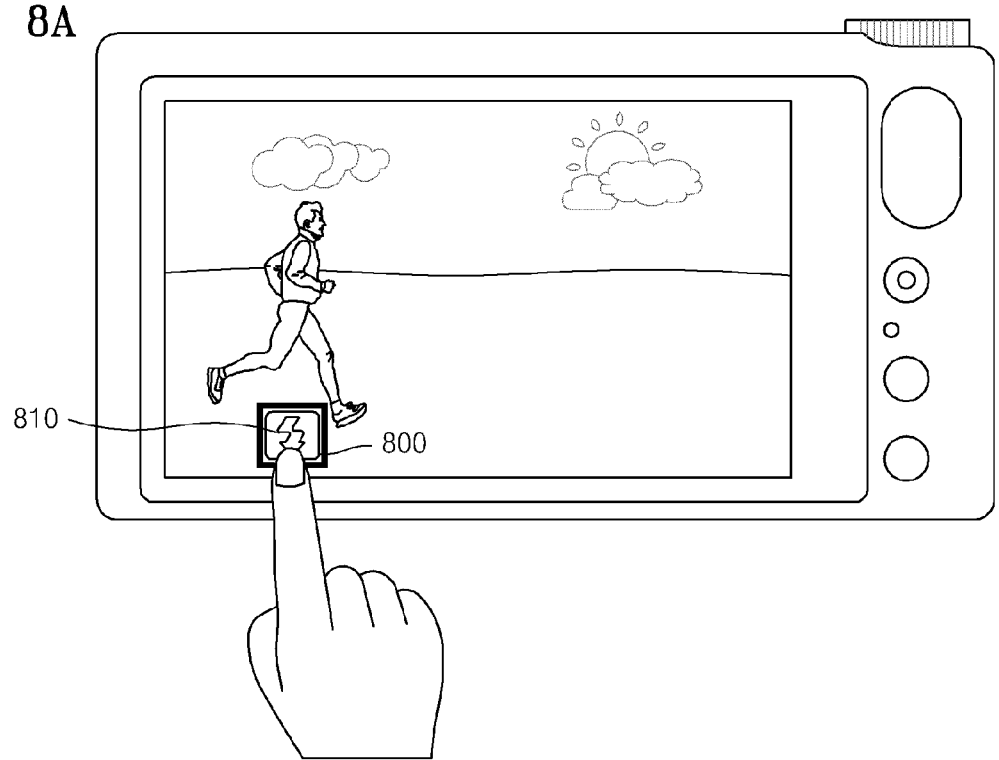
FIGS. 8A, 8B, and 8C are diagrams illustrating an example of setting an AF region according to another embodiment.
Figure 8B:
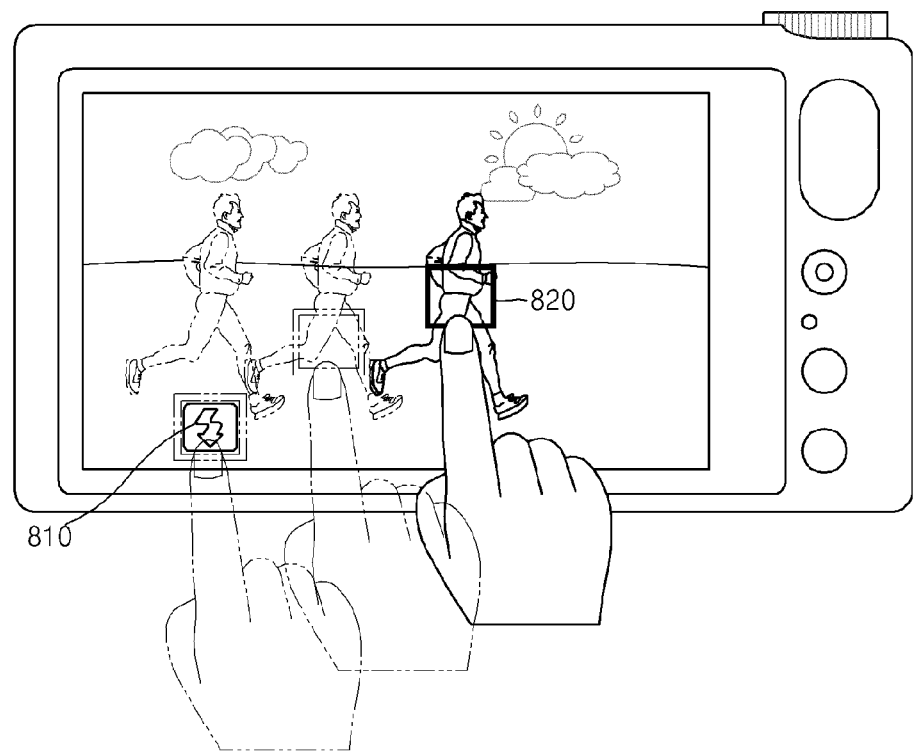
Figure 8C:
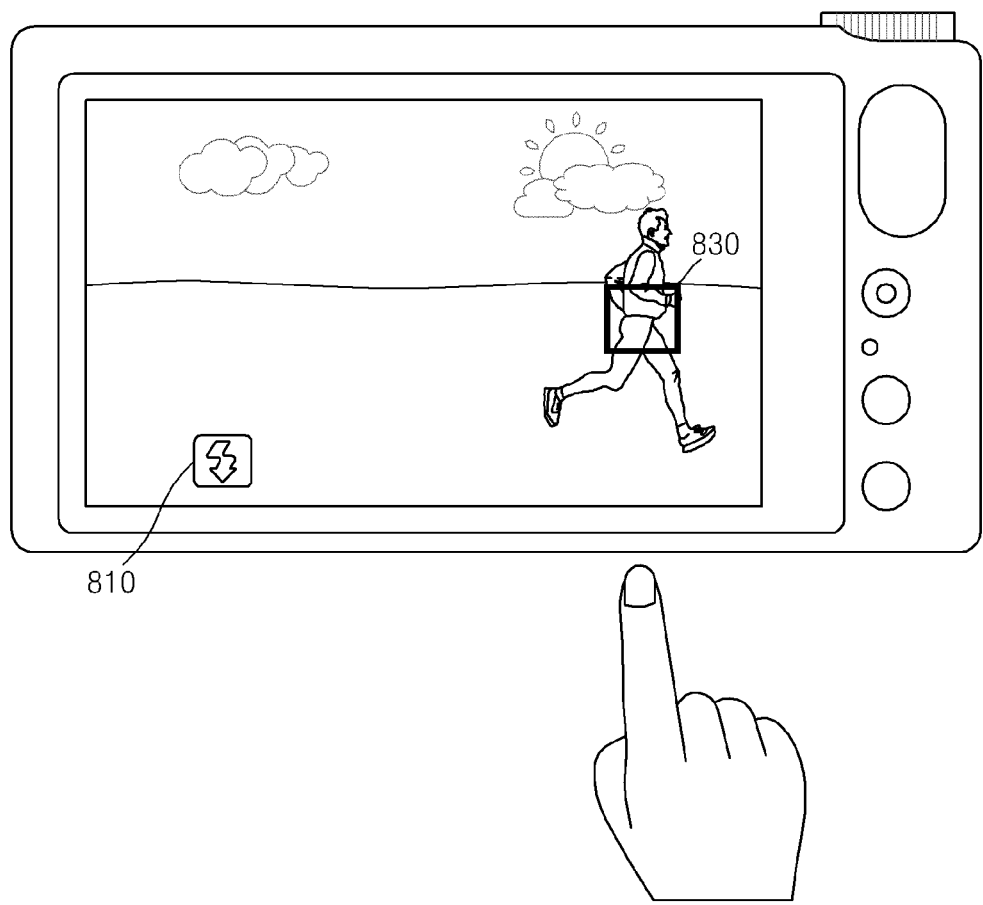

Referring to FIGS. 8A to 8C, an AF region 800 and an execution icon 810 overlap with a region that receives a user's touch input, as illustrated in FIG. 8A. In current touchscreen implementations, when the user intends to touch a certain region of the touchscreen, and then sets an AF region, the user would unintentionally activate the icon 810, thereby executing an undesired operation. Therefore, in an embodiment, when the execution icon is present in the touch region, whether to execute the execution icon is determined according to whether a drag input is subsequently received.

As illustrated in FIG. 8B, an AF frame 820 is dragged and shifted. That is, when the AF frame 800 is dragged, the execution icon 810 is not executed.

As illustrated in FIG. 8C, when the user releases a touch after a drag, that is, when the user takes off his finger, an AF frame 830 is set as an AF region.

In general, since execution icons are disposed on a touchscreen, a relevant function may be performed or a setting may be changed by touching one. In this case, when a region having both an image to be captured and an execution icon overlaps with an AF region, the photographing apparatus should determine whether to activate the icon or to set an AF region. According to an embodiment, when the AF region is set by a touch input, a drag input, and a touch release input, the execution icon is not executed and, instead, an AF setting operation is performed, thereby making it possible for the user to intuitively operate the photographing apparatus and to use the touch screen efficiently.

Also, when a subject to be photographed is moving, the AF target checking unit 203 checks an AF target by tracking the subject according to the drag input received from the user input recognizing unit 201. Also, the AF region setting unit 202 sets a region, including the subject, as an AF region based on the outcome of the tracking operation performed by the AF target checking unit 203. In this case, the AF region setting unit 202 may correct the AF region (which was set by the user's touch, drag, and touch release input) based on the outcome of the tracking operation performed by the AF target checking unit 203. For example, assume the subject is moving and the user touches the display screen to focus the subject. Further assume that the user tries to track the subject while dragging AF region, and also tries to time the touch release so as to keep the subject within the AF tracking region. The AF target checking unit 230 tracks the subject according to the user's drag input. As the subject moves out of the AF frame, the AF target checking unit 203 continues to treat the subject as an AF target, and tracks the subject for a predetermined time. In other words, even though the subject deviates from the AF frame after the user releases the touch, the AF target checking unit 230 recognizes the subject as an AF target, and the AF frame (which had been set according to the touch release) may be shifted to the current position of the subject.

In an embodiment, the AF target checking procedure discussed above may address the difficulties of focusing on a moving subject. This procedure may allow the user to focus on and track the moving subject by simply dragging the AF region. By recognizing and continuously tracking the subject according to the user's drag input, the AF frame may be shifted to the position of the moving subject (that is, the position of the subject recognized by the tracking) even after the user's touch is released. Once the AF region is set, the user may then take the photograph.

Figure 6:
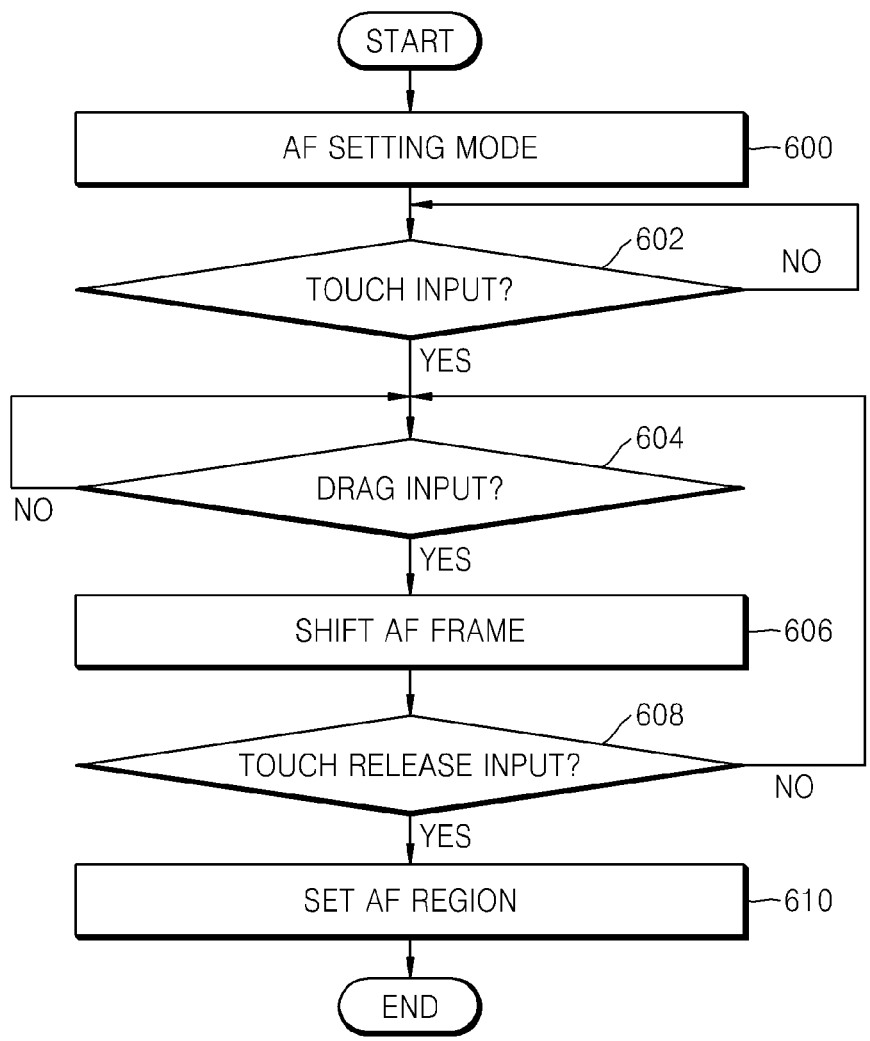
FIG. 6 is a flowchart illustrating a method of controlling the photographing apparatus, according to an embodiment.

FIG. 6 is a flowchart illustrating a method of controlling the photographing apparatus, according to an embodiment.

Referring to FIG. 6, in operation 600, the photographing apparatus is put into an AF setting mode. In the context of FIG. 6, the term "AF setting mode" refers to a mode in which an AF region is set according to a touch input, a drag input, and a touch release input on the display screen according to an embodiment. Not all embodiments include operation 600 however. In other words, the photographing apparatus does not necessarily need to enter an AF setting mode.

When there is a touch input in operation 602, the photographing apparatus determines whether a drag input has been received in operation 604. The user may touch a certain region on the display screen, and the photographing apparatus may determine whether a drag input has been received after the touch. The AF frame may be displayed according to the touch input, and a color of the AF frame may be changed for AF region setting. Otherwise, when there is not a drag input, the photographing apparatus returns to operation 604 and determines again whether a drag input has been received.

If a drag input has been received in operation 604, the photographing apparatus shifts the AF frame in operation 606. The AF frame is shifted to a region to be focused according to how the user drags the AF frame after the touch input.

If a touch release is input in operation 608, the photographing apparatus sets an AF region in operation 610. Otherwise, when a touch release is not input in operation 608, the photographing apparatus returns to operation 604 and determines again whether a drag input has been received.

The method of controlling the photographing apparatus, according to an embodiment, may solve the problem of an AF region change that is generated because the user touches the touchscreen by mistake. Such a mistake may occur when the user grips the apparatus near the touchscreen. This is particularly true with more modern photographing apparatuses, which have larger touchscreens and thinner bezels (i.e., the edge portion of the touch panel is thinner).

FIG. 7 is a flowchart illustrating a method of controlling the photographing apparatus, according to another embodiment.

Referring to FIG. 7, in operation 700, the photographing apparatus is put into an AF setting mode.

If a touch input has been received in operation 702, the photographing apparatus determines whether an icon is present in a touch region, in operation 704. Otherwise, if a touch release has not been received, the photographing apparatus returns to operation 702.

When an icon is present in the touch region in operation 704, the photographing apparatus determines whether a drag input has been received, in operation 706. If a drag input has not been received, the photographing apparatus executes a touched icon in operation 714.

Otherwise, if a drag input has been received in operation 706, the photographing apparatus shifts an AF frame according to the drag input in operation 708.

If a touch release is input in operation 710, the photographing apparatus sets an AF region in operation 712. Otherwise, if a touch release is not input in operation 710, the photographing apparatus returns to operation 706.

The method of controlling the photographing apparatus, according to another embodiment, may solve the problem of having to determine which region should be performed when an region, including an image to be captured, overlaps with the AF region, in an environment where execution icons are disposed on the touchscreen and thus a relevant function may be performed or setting may be changed by a touch, and may prevent an error in AF region setting.

As described above, according to the one or more of the above embodiments, the AF region may be set according to a touch, a drag, and a touch release on the touchscreen, thereby making it possible to prevent the AF region from being easily shifted by an unintended touch of the user.

An apparatus according to various embodiments may include a processor, a memory that stores and executes program data, a permanent storage such as a disk drive, a communication port that communicates with an external apparatus, a user interface such as a touch panel, a key, a button, or the like, etc All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the embodiments.

The embodiments may be described in terms of functional block components and various processing steps. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, the embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description but by the following claims, and all differences within the scope will be construed as being included in the disclosure.

No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Operations of methods described herein may be performed in any appropriate order. The scope of this disclosure is not limited by the following claims, it is not limited by the examples or the exemplary terms. It will be understood by those of ordinary skill in the art that various modifications, combinations, and changes in form and details may be made according to design conditions and factors therein without departing from the spirit and scope as defined by the following claims or equivalents thereof.

What is claimed is:

1. A method of controlling a photographing apparatus, the method comprising:
    displaying a movable auto-focusing (AF) frame for AF region setting on a display screen according to a touch input;
    shifting the movable AF frame according to a drag input to the AF frame; and
    setting the movable AF frame as an AF region when a touch release input is received,
    wherein when an execution icon is overlapped with the movable AF frame corresponding to the touch input, whether to execute the execution icon is determined according to the drag input after the touch input, and
    wherein the execution icon is not executed when the drag input is received.

2. The method of claim 1, wherein the AF frame is shifted according to a drag direction when the drag input is received.

3. The method of claim 1, further comprising:
    displaying an initial AF frame on the display screen; and
    displaying the AF frame having a different color from a color of the initial AF frame when the touch input is received.

4. The method of claim 3, wherein the color of the AF frame is changed into the color of the initial AF frame when the touch release input is received.

5. The method of claim 1, wherein when a subject is moving, the subject is tracked according to the drag input.

6. The method of claim 5, wherein a region, including the subject, is set as the AF region according to a result of the tracking.

7. The method of claim 6, wherein the AF region is corrected according to the result of the tracking.

8. The method of claim 1, wherein the AF frame is fixed when another touch input is received on the display screen after the AF region is set.

9. The method of claim 1, further comprising displaying a graphical user interface (GUI) indicating the setting of the AF region when the touch input is received.

10. A non-transitory recording medium that stores a program which, when executed by a computer, performs the method of claim 1.

11. A photographing apparatus comprising:
    a user input recognizing unit configured to recognize at least one of a touch input, a drag input, and a touch release input on a display screen;
    an auto-focusing (AF) region setting unit configured to display a movable AF frame for AF region setting on the display screen according to the touch input, shift the AF frame according to the drag input to the movable AF frame, and set the movable AF frame as an AF region when the touch release input is received; and
    an AF target checking unit configured to determine, when an execution icon is overlapped with the movable AF frame corresponding to the touch input, whether to execute the execution icon according to the drag input after the touch input, and not to execute the execution icon when the drag input is received.

12. The photographing apparatus of claim 11, wherein the AF region setting unit shifts the AF frame according to a drag direction when the drag input is received.

13. The photographing apparatus of claim 11, wherein an initial AF frame is displayed on the display screen, and the AF frame having a different color from a color of the initial AF frame is displayed when the touch input is received.

14. The photographing apparatus of claim 11, further comprising an AF target checking unit configured to track, when a subject is moving, the subject according to the drag input to check an AF target.

15. The photographing apparatus of claim 14, wherein the AF region setting unit sets a region, including the subject, as the AF region according to a result of the tracking by the AF target checking unit.

16. The photographing apparatus of claim 15, wherein the AF region is corrected according to the result of the tracking.

17. The photographing apparatus of claim 11, wherein a graphical user interface (GUI) indicating the setting of the AF region is displayed when the touch input is received.

* * * * *